Figure 1:
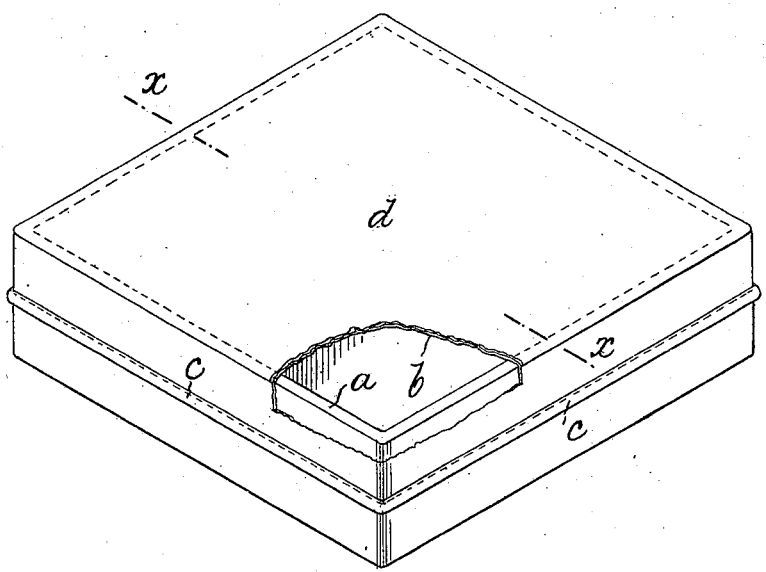

No. 661,056. Patented Nov. 6, 1900.
M. & A. JOLLES & J. TRENKLER.
FILTERING MATERIAL AND PROCESS OF MAKING SAME.
(Application filed May 27, 1899.)
(No Model.)

UNITED STATES PATENT OFFICE.

MAX JOLLES, ADOLF JOLLES, AND JULIUS TRENKLER, OF VIENNA, AUSTRIA-HUNGARY, ASSIGNORS TO FILTERWERKE KUFFLER & CO., OF SAME PLACE.

FILTERING MATERIAL AND PROCESS OF MAKING SAME.

SPECIFICATION forming part of Letters Patent No. 661,056, dated November 6, 1900.

Application filed May 27, 1899. Serial No. 718,592. (No specimens.)

*To all whom it may concern:*

Be it known that we, MAX JOLLES, ADOLF JOLLES, and JULIUS TRENKLER, subjects of the Emperor of Austria-Hungary, residing at Vienna, in the Province of Lower Austria, in the Empire of Austria-Hungary, have invented certain new and useful Improvements in Filters and the Process of Their Manufacture; and we do hereby declare the following to be a full, clear, and exact description of the invention, such as will enable others skilled in the art to which it appertains to make and use the same.

As is well known, in addition to sand, carbon, and compositions of all kinds, asbestos and other porous silicates, as kieselguhr and sandstone, are at present mainly employed to form filtering substrata. Asbestos is used in many ways—viz., either directly in the form of a tissue or woven fabric in the form of fibers, which in order to make a filtering layer are drawn by suction upon a perforated support of wood or metal, or, lastly, in the form of powder, which is put upon a fine-mesh sieve, so as to form a layer that serves as a filtering medium. Now if asbestos in itself offers a very suitable filtering material nevertheless the filtration obtained with it is made almost completely illusory by its present form of employment. Filters of asbestos tissues possess, namely, the defect that in the course of use the meshes of the tissues become loose—that is, they open out—whereby it is rendered possible for the smaller impure particles of the liquid to be filtered to pass along in the filtrate, while, again, in filters of asbestos fibers in layers there arises the disadvantage that the sucking on of the asbestos fibers can never be so effected in such a uniform manner that uncovered—i. e., asbestos fill—interstices do not remain, which likewise give channels for the passage of dirt particles in the filtrate. On similar grounds the process of filtering by means of heaped-up asbestos-powder also often fails. The other silicates—as kieselguhr, sandstone, clay, &c., or mixtures of the same, which are compressed into cylindrical or prismatic shapes by various known processes, and are then used as filter elements—exhibit on their side the disadvantage that in this condition they present to the substance to be filtered layers that are too thick-walled or too-finely porous, so that filtration can take place only with the aid of a pressure or suction action. Furthermore, the pores of these filters are very soon stopped up by the impurities of the substance to be filtered. In consequence of its becoming often necessary owing to this state of things to clean and change the stopped-up filter elements, with consequent waste of time, filtration by means of silicates or stone blocks of the kind mentioned is industrially too costly and difficult to perform.

Now the present invention relates to novel filters or novel filtering material composing these filters, which is entirely free from the defects hereinbefore mentioned.

Figure 2:
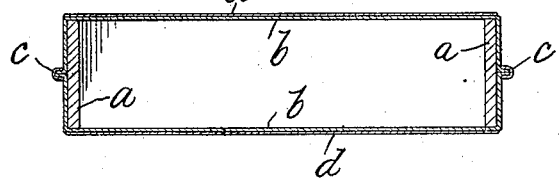

Referring to the drawings, in which like parts are similarly designated, Figure 1 is a perspective view of a filter element having part broken away, and Fig. 2 a section on the line $x\, x$ of Fig. 1.

Over a suitable framing $a$ is stretched an asbestos, wool, cotton, jute, or other animal, vegetable, or mineral fabric $b$, upon which is deposited or formed the layer of filtering material $d$, hereinafter described. The binding edge $c$ unites the two halves of the elements when stretched over the frame $a$. This filtering material is produced as follows: A fine-meshed tissue or woven fabric is covered or impregnated with a thin layer of insoluble, fireproof, and at the same time porous substances, and this layer is firmly and inseparably united with the tissue before referred to by the process hereinafter described. Asbestos is especially to be recommended as the material for the fine-meshed tissue. Tissues of wool, peat, linen or flax, cotton, artificial wool, &c., are indeed likewise applicable; but they are less to be recommended, inasmuch as in consequence of the subsequently necessary heating they may under certain circumstances prove to be less durable, and this is especially the case when the tissue is not covered by the hereinbefore-mentioned superimposed layer, so as to be perfectly uniformly dense and free from gaps, so that direct access is presented to the hot gases. By laying on a completely-inclosing layer, on the contrary, this defect is gotten rid of, since a shield is formed, as it were, which, owing to its low heat-conducting power, prevents the outer hot gases from exerting their full heat effect on the tissue beneath.

Conformably to this invention all bodies composed for the most part of silicates—as, for example, asbestos and meerschaum-dust, talc, soapstone, steatite, kieselguhr, sand, pumice-stone, feldspar, quartz, silicates of alumina, also the so-called Paulke "bleaching-clay" and "terra-chera"—materials which (see *Pharmaceutische Centralhalle*, Vol. 39, pages 307 and 734) consist of alumina and magnesia silicates. Furthermore, bone-black or other porous kinds of carbon can be used as insoluble, fireproof, and porous materials and either separately or in any desired mixture and in finely-powdered condition for the production of the superincumbent layer upon the fine-meshed tissue.

The durable, firm, and inseparable or insoluble union of the above-mentioned substances with the tissue is brought about either by means of silicic acid separated from alkaline silicates by treatment with acids and rendered insoluble by subsequent heating or by means of equally-insoluble compounds (fluorids) obtained by heating from silicofluorids which are soluble in water or dilute acids. It is of great importance in connection with this that the formation of these insoluble compounds, acting, as it were, as cement, should take place directly on the tissue itself.

The combination of the porous materials before mentioned with the tissue is effected as follows: The said porous materials are made into a uniform thick pap, pulp, or semifluid by mixing them with an aqueous solution of one or more alkaline silicates or with a solution of silico-fluorids (of any desired and known kind) in water or dilute acids which have the peculiarity of leaving behind after evaporation of the solvent, as well as after the heating of the residue, compounds (silicic acid or fluorids) insoluble in water and acids, and this pap, pulp, or semifluid is laid on the tissue in a thin sheet. The coated tissue is then as soon as it has been air-dried exposed to a great heat. When alkaline silicates are used, a thorough soaking of the superincumbent layer with dilute acids for the purpose of separating the silicic acid must first of all take place, and the removal of the alkaline salts then formed is effected by subsequent lixiviation, in so far as they have not already been volatilized by the heating.

By means of the hereinbefore-mentioned insoluble compounds, which form at a temperature of 200° to 500° centigrade, the fireproof and porous substances present in the mass are cemented firmly to the tissue, as well as to one another, as if by a binding material, and the result is a thin porous layer, which, together with the asbestos tissue beneath, presents an excellent filtering material which cannot be passed through even by the smallest solid particles suspended in the liquid to be filtered. This filtering material has the further advantage over the so-called "block-filters" that the thin filter layer does not affect the rate of filtration too greatly, so that this nearly equals that which can be obtained by means of a simple tissue. If, for example, the solution of magnesium-silico fluorid in water or dilute acids is evaporated and the residue heated, there escapes, as is well known, silicium fluorid, and magnesium fluorid remains behind as the insoluble body 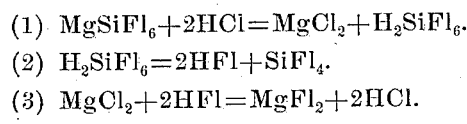 The hydrochloric acid that may be added to the water makes no difference to the result of the preceding process. Its addition is generally mainly intended to bring larger quantities of the silicofluorids into solution or to prevent the formation of basic salts, and the process to be performed in its presence in the case mentioned should be such that, first, by the action of the hydrochloric acid on the magnesiumsilico fluorid, hydrofluosilicic acid and magnesium chlorid is formed, then on the subsequent heating, since the hydrofluosilicic acid splits up into silicium fluorid and hydrofluoric acid, the magnesium chlorid is destroyed by the hydrofluoric acid formed with the formation of magnesium fluorid and hydrochloric acid.

(1) $MgSiFl_6 + 2HCl = MgCl_2 + H_2SiFl_6$.

(2) $H_2SiFl_6 = 2HFl + SiFl_4$.

(3) $MgCl_2 + 2HFl = MgFl_2 + 2HCl$.

It is advantageous to add to the solution of the silico-fluorid an earth-alkali chlorid—*e. g.*, calcium chlorid, strontium chlorid, &c.—whereby there is formed, after evaporating the solvent and subsequently heating the residue to about 400° centigrade, with escape of silicium fluorid and hydrochloric acid, a compound likewise insoluble and surpassing the magnesium fluorid in binding power, which consists principally of the fluor salt of the particular metal earth alkali. The soluble bodies existing in this residue, which originate partly in the course of the process (magnesium chlorid) and partly arise from the addition in excess of the earth-alkali chlorid, may be removed by subsequent lixiviation of the filtering material.

The hereinbefore-described process may be represented by the following equations:

(1) $MgSiFl_6 + CaCl_2 + 2HCl = MgCl_2 + CaCl_2 + H_2SiFl_6$.

(2) $H_2SiFl_6 = SiFl_4 + 2HFl$.

(3) 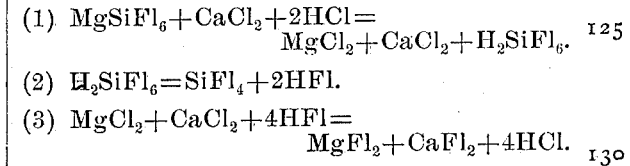

It may be remarked here that a permanently-firm cementing of the filtering material is only successfully attained when the method characteristic of the present process of obtaining the magnesium fluorid, &c., which acts as binding material, is carried out—that is to say, when the separation of the same takes place directly on the tissue itself by heating suitable compounds, while a durable fastening of the filtering material can in no way be arrived at by placing prepared magnesium fluorid straightway on the tissue.

For the purpose of manufacturing the novel filter which is here in question a frame (provided with an outlet-cock) of any desired known kind, of wood or metal for single elements, preferably of hexagonal or cylindrical shape, for several interconnected filter elements of prismatic (parallelepipedon) or cubical shape, is surrounded on all sides by a fine-meshed asbestos tissue, on which is placed a thin layer of a material which is produced in the following manner: One or more of the hereinbefore-mentioned fireproof and porous substances—for example, asbestos-powder, Paulke bleaching-clay, bone-black, or a desired mixture of such substances—is stirred into a hydrochloric-acid solution of magnesium silico-fluorid and calcium chlorid, the density of which is about 30° to 50° Baumé, until a uniform paste results. This paste is smeared over the asbestos tissue. After this is completely smeared over one waits until it is air-dried and then puts the frame for from one to two hours in an oven heated to a temperature of about 200° to 500° centigrade. The element taken out of the oven is cooled and washed until none of the substances—for example, calcium chlorid—adhering to the filter are found in the wash-water in soluble form. The filter element is then placed in a vessel of sheet-iron or other suitable material and its discharge-pipe is joined tight with the suitably-provided outlet of the vessel.

In the case of filters of larger size several elements are placed in this way in a large vessel of sheet-iron or cement, and their outlets are united to a common discharge-pipe of the vessel. Filtration goes on sufficiently of itself by reason of the difference in level of the dirty water and the filtrate; but the rate of filtration can be increased by lengthening the discharge-pipe or by using pressure or by elevating the dirty-water vessel, the filter vessel being of course necessarily closed on all sides and made of correspondingly-strong material.

For producing the firm connection between the tissue and the superimposed layer an aqueous solution of water-glass may be used instead of a solution of silico-fluorids.

We claim—

1. The process of producing filtering media, which consists in saturating an asbestos fabric with a solution of silicic acid or a silicate and a fluorid of the alkaline earths, and rendering the coating insoluble and adherent to said fabric by means of heat, substantially as described.

2. The process of producing filtering media, which consists in saturating a fabric with a solution of silicic fluorids, and depositing the non-vaporizable residues on the fabric by means of heat, substantially as described.

3. The process of producing filtering media, which consists in coating a fabric with a solution of silicic acid or a soluble silicate, decomposing the silicic acid or the soluble silicate on the fabric by means of heat and coating the prepared fabric with a paste of soluble and insoluble silicates in acid solution, drying and heating, substantially as described.

4. The process of producing filtering media, which consists in coating an asbestos fabric with a mixture of soluble or insoluble silicates and carbon in acid solution, heating to drive off the vaporizable constituents, and washing to dissolve the soluble constituents, substantially as described.

5. The process of producing filtering media, which consists in coating a fabric with an acid solution of silico-fluorids, adding thereto a fluorid of the alkaline-earth metals, vaporizing the volatile constituents and washing out the soluble constituents remaining after the heating, substantially as described.

6. The process of producing filtering media, which consists in coating an asbestos fabric with a paste composed of a hydrochloric-acid solution of a silico-fluorid, a fluorid of the alkaline-earth metals and carbon, heating the coated fabric to render the soluble constituents insoluble and vaporize the volatile fluorids, and washing to remove the remaining soluble constituents, substantially as described.

7. The process of producing filtering media, which consists in saturating a mineral, animal or vegetable fabric with an aqueous solution of an alkaline silicate, and heating to a temperature of from 200° to 500° centigrade, substantially as set forth.

8. The process of producing filtering media, which consists in saturating a fabric with a solution of an alkaline silicate, coating the so-prepared fabric with porous material saturated with an alkaline-silicate and fluorid solution, and heating to the fusion-point of the alkaline silicate, substantially as set forth.

9. The herein-described product, comprising a fabric having chemically-deposited filtering media thereon, composed of insoluble silicates and fluorids.

10. The herein-described product, comprising a silicious fabric having deposited thereon a filtering media composed of carbon cemented by silicates and fluorids rendered insoluble.

In testimony that we claim the foregoing as our invention we have signed our names in presence of two subscribing witnesses.

MAX JOLLES.
ADOLF JOLLES.
JULIUS TRENKLER.

Witnesses:
ALVESTO S. HOGUE,
AUGUST FUGGER.